United States Patent
Lim et al.

(10) Patent No.: US 9,360,735 B2
(45) Date of Patent: Jun. 7, 2016

(54) CAMERA MODULE

(71) Applicant: SAMSUNG ELECTRO-MECHANICS CO., LTD., Suwon (KR)

(72) Inventors: Soo Cheol Lim, Suwon (KR); Sung Ryung Park, Suwon (KR); Yutaka Yamauchi, Suwon (KR); Byung Woo Kang, Suwon (KR); Sang Min On, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 13/831,774

(22) Filed: Mar. 15, 2013

(65) Prior Publication Data

US 2014/0072289 A1 Mar. 13, 2014

(30) Foreign Application Priority Data

Sep. 7, 2012 (KR) .......................... 10-2012-0099361

(51) Int. Cl.
*G03B 17/00* (2006.01)
*G03B 3/10* (2006.01)
*G03B 13/36* (2006.01)
*G03B 5/00* (2006.01)
(Continued)

(52) U.S. Cl.
CPC *G03B 13/36* (2013.01); *G02B 7/00* (2013.01); *G02B 7/08* (2013.01); *G02B 7/36* (2013.01); *G02B 27/646* (2013.01); *G03B 3/10* (2013.01); *G03B 5/00* (2013.01); *G03B 17/02* (2013.01); *H04N 5/2257* (2013.01); *G03B 2205/0015* (2013.01); *G03B 2205/0069* (2013.01)

(58) Field of Classification Search
USPC .......... 396/55, 133; 359/554–557; 348/208.4, 348/208.7, 208.11
See application file for complete search history.

(56) References Cited

U.S. PATENT DOCUMENTS 5,689,369 A * 11/1997 Noguchi ........................ 359/557
7,869,150 B2 * 1/2011 Yoon et al. .................... 359/824
(Continued)

FOREIGN PATENT DOCUMENTS

CN 101990755 A 3/2011
CN 102047164 A 5/2011
(Continued)

OTHER PUBLICATIONS

Chinese Office Action issued Oct. 20, 2015 in counterpart Chinese Patent Application No. 201310263425.7 (pp. 1-19 in English; pp. 20-34 in Chinese).

(Continued)

*Primary Examiner* — Minh Phan
(74) *Attorney, Agent, or Firm* — NSIP Law

(57) ABSTRACT

Disclosed herein is camera module including: a lens barrel; an auto-focusing actuator; and a handshake compensating actuator, wherein the auto-focusing actuator and the handshake compensating actuator include a common magnet for actuating auto-focusing and handshake compensation, an auto-focusing corner magnet, a coil for auto-focusing, and a coil for handshake compensation, one surface of the common magnet for actuating auto-focusing and handshake compensation and the auto-focusing corner magnet face the coil for auto-focusing and the other surface of the common magnet for actuating auto-focusing and handshake compensation faces the coil for handshake compensation.

19 Claims, 5 Drawing Sheets

(51) Int. Cl.

| | | |
|---|---|---|
| *G02B 7/00* | (2006.01) | |
| *G03B 17/02* | (2006.01) | |
| *G02B 7/08* | (2006.01) | |
| *G02B 7/36* | (2006.01) | |
| *G02B 27/64* | (2006.01) | |
| *H04N 5/225* | (2006.01) | |

(56) References Cited

U.S. PATENT DOCUMENTS

| | | | |
|---|---|---|---|
| 8,300,105 B2 * | 10/2012 | Byon et al. | ............ 348/208.7 |
| 8,611,734 B2 | 12/2013 | Lim et al. | |
| 2007/0047942 A1 * | 3/2007 | Chang et al. | ............ 396/133 |
| 2011/0096178 A1 | 4/2011 | Ryu et al. | |
| 2012/0099201 A1 * | 4/2012 | Chan et al. | ............ 359/557 |
| 2012/0106936 A1 * | 5/2012 | Lim et al. | ............ 396/55 |
| 2012/0154614 A1 | 6/2012 | Moriya et al. | |
| 2013/0163085 A1 * | 6/2013 | Lim et al. | ............ 359/557 |

FOREIGN PATENT DOCUMENTS

| | | |
|---|---|---|
| CN | 102466942 A | 5/2012 |
| JP | 2009-271204 A | 11/2009 |
| JP | 2011-065140 A | 3/2011 |
| JP | 2011-085666 A | 4/2011 |
| JP | 2012-008379 A | 1/2012 |
| WO | 2011/062123 A1 | 5/2011 |

OTHER PUBLICATIONS

Japanese Office Action issued Oct. 6, 2015 in counterpart Japanese Patent Application No. 2014-216212 (pp. 1-6 in Japanese; pp. 7-12 in English).

\* cited by examiner

CAMERA MODULE

CROSS REFERENCE TO RELATED APPLICATION

This application claims the benefit of Korean Patent Application No. 10-2012-0099361, filed on Sep. 7, 2012, entitled "Camera Module", which is hereby incorporated by reference in its entirety into this application.

BACKGROUND OF THE INVENTION

1. Technical Field

The present invention relates to a camera module.

2. Description of the Related Art

Recently, as a high-resolution, multi-functional, and micro camera module is widely spread, the use of the camera module has been more expanded for mobile devices, such as a mobile phone, a notebook PC, a tablet PC, and the like.

In addition, as the camera module is miniaturized, it is more difficult to manufacture and assemble an optical system that includes a lens that is a core component configuring a camera device, an auto-focusing (AF) device that controls a focus by moving the optical system to an optical axis, an image sensor (CMOS, CCD sensor, and the like) that changes a subject to an electrical signal, and the like. There is a problem in that the performance of the camera module that is smaller and smaller so as to apply each component and a design between components, a level of manufacturing tolerance and assembling tolerance, and the like, that slightly affect performance in a camera of the existing digital camera level or more to mobile devices is degraded, such that it is more difficult to obtain a high-quality image.

In more detail, a user's handshake occurs at the time of photographing and image blurring occurs due to the handshake, such that a clear image cannot be obtained. That is, when a user intends to photograph a subject by starting a camera operation, the lens moves in an optical axis direction in the case of the camera including the auto-focusing function to clearly focus an image of a subject on an imaging device (image sensor).

When the auto-focusing function is performed, the clear image can be generally obtained, but the image blurs due to the user's handshake at the time of photographing without using a fixation, such as a tripod, and the like. When the handshake does not occur, the subject image is focused on the imaging device as an optimal focus. In this case, when the handshake occurs by the user, the image blurring occurs. In this case, the image blurring is prevented by focusing the same image at the same position at all times in terms of the image sensor by moving the optical lens in a direction vertical to the optical axis, such that the clear image can be obtained.

As described above, a method for compensating for the handshake by moving the lens in the direction vertical to the optical axis is generally referred to as a lens moving method. On the other hand, a method for fixing the lens and moving the image sensor in a direction vertical to the optical axis is referred to as a sensor moving method. As a result, the handshake is compensated by giving the relative displacement of the lens and the image sensor in the direction vertical to the optical axis.

However, the camera module such as Patent Document described in the following Prior Art Document further includes a handshake compensating device in addition to the auto-focusing device.

In this case, the handshake compensating device generally needs a two-axis actuator, such that the assembling man-hour is increased while increasing the number of components of the camera module. In addition, the handshake compensating device also affects the size of the camera module, such that the size of the camera module may generally be increased.

PRIOR ART DOCUMENT

Patent Document (Patent Document 1) WO11/062,123

SUMMARY OF THE INVENTION

The present invention has been made in an effort to provide a camera module performing auto-focusing and handshake compensation using a common magnet for actuating auto-focusing and handshake compensation that are included in an auto-focusing actuator and a handshake compensating actuator.

In addition, the present invention has been made in an effort to provide a camera module capable of more efficiently actuating auto-focusing by including an auto-focusing corner magnet in addition to a common magnet for actuating auto-focusing and handshake compensation.

Further, the present invention has been made in an effort to provide a camera module capable of adjusting and controlling actuating force and actuating sensitivity of auto-focusing by adjusting polarization length of a common magnet for actuating auto-focusing and handshake compensation that is opposite to a coil for auto-focusing.

According to a preferred embodiment of the present invention, there is provided a camera module including: a lens barrel including at least one imaging lens; an auto-focusing actuator moving the lens barrel in an optical axis direction; and a handshake compensating actuator moving the lens barrel in a direction orthogonal to an optical axis, wherein the auto-focusing actuator and the handshake compensating actuator include a common magnet for actuating auto-focusing and handshake compensation, an auto-focusing corner magnet, a coil for auto-focusing, and a coil for handshake compensation, one surface of the common magnet for actuating auto-focusing and handshake compensation and the auto-focusing corner magnet face the coil for auto-focusing and the other surface of the common magnet for actuating auto-focusing and handshake compensation faces the coil for handshake compensation, and the common magnet for actuating auto-focusing and handshake compensation and the auto-focusing corner magnet that face the coil for auto-focusing are magnetized with the same pole.

The auto-focusing actuator may include: a common magnet for actuating auto-focusing and handshake compensation that faces the coil for auto-focusing and the coil for handshake compensation; a bobbin assembly wound with the coil for auto-focusing and mounted with the lens barrel; an auto-focusing corner magnet facing the auto-focusing coil; upper and lower housings mounted with the common magnet for actuating auto-focusing and handshake compensation, the bobbin assembly, and the auto-focusing corner magnet; and a suspension support member having one end coupled with the auto-focusing actuator and the other end coupled with the housing of the handshake compensating actuator so as to elastically support the auto-focusing actuator to the handshake compensating actuator.

The bobbin assembly may be provided with a first corner part and a second corner part that face each other, wherein an outer side of the opposite first corner part is provided with the auto-focusing corner magnet, and an outer side of the opposite second corner part is provided with the common magnet for actuating auto-focusing and handshake compensation.

The first corner part of the bobbin assembly may be indented to an inside of the bobbin assembly as much as a size corresponding to the auto-focusing corner magnet.

The auto-focusing actuator may be further provided with a yoke coupled with upper and lower housings so as to cover the common magnet for actuating auto-focusing and handshake compensation and one surface of the auto-focusing corner magnet.

The auto-focusing actuator may be further provided with an upper plate elastic member and a lower plate elastic member each mounted on the upper housing and the lower housing.

The handshake compensating actuator may include: a coil for handshake compensation disposed to correspond to the common magnet for actuating auto-focusing and handshake compensation; a printed circuit board for handshake compensation mounted with the coil for handshake compensation so as to be electrically connected; a hall sensor sensing a movement of the lens barrel; and a housing of a handshake compensating actuator mounted with the printed circuit board for handshake compensation and the hall sensor.

The auto-focusing actuator may be seated in the handshake compensating actuator so that the common magnet for actuating auto-focusing and handshake compensation faces the coil for handshake compensation in the state in which the auto-focusing actuator is supported to the suspension support member.

Four common magnets for actuating auto-focusing and handshake compensation may be disposed and two auto-focusing corner magnets may be disposed, so as to face the coil for auto-focusing wound around the outer side of the bobbin assembly.

The common magnet for actuating auto-focusing and handshake compensation may be to magnetized with two poles in a thickness direction of the common magnet for actuating auto-focusing and handshake compensation that is a direction orthogonal to the optical axis of the camera module and thus, is formed of an inner magnet magnetized to the inner side thereof and an outer magnet magnetized to an outer side thereof.

The inner magnet may face the coil for auto-focusing, the outer magnet may face the coil for handshake compensation, and the inner magnet and the outer magnet may be magnetized so that adjacent poles become different poles.

The common magnet for actuating auto-focusing and handshake compensation may be magnetized so that a length of one pole facing the coil for auto-focusing is larger than a length of the other pole adjacent thereto.

The common magnet for actuating auto-focusing and handshake compensation may be polarized at a length ratio in which a polarization ratio in a length direction is 1: N (N=1 to 5), a pole of which the polarization length ratio is N facing the coil for auto-focusing.

According to another preferred embodiment of the present invention, there is provided a camera module, including: a lens barrel including at least one imaging lens; an auto-focusing actuator moving the lens barrel in an optical axis direction; and a handshake compensating actuator moving the lens barrel in a direction orthogonal to an optical axis, wherein the auto-focusing actuator and the handshake compensating actuator include a common magnet for actuating auto-focusing and handshake compensation, a coil for auto-focusing, and a coil for handshake compensation, one surface of the common magnet for actuating auto-focusing and handshake compensation faces a coil for auto-focusing, the other surface of the common magnet for actuating auto-focusing and handshake compensation faces the coil for handshake compensation, and one pole of the common magnet for actuating auto-focusing and handshake compensation adjacently faces the coil for auto-focusing and the other pole of the common magnet for actuating auto-focusing and handshake compensation is disposed farther from the coil for auto-focusing when comparing with one pole.

The auto-focusing actuator and the handshake compensating actuator may further include a yoke, one pole of the common magnet for actuating auto-focusing and handshake compensation may face the coil for auto-focusing and the other pole of the common magnet for actuating auto-focusing and handshake compensation may be covered by the yoke.

The auto-focusing actuator may include: a common magnet for actuating auto-focusing and handshake compensation facing the coil for auto-focusing and the coil for handshake compensation; a bobbin assembly around which the coil for auto-focusing is wound and in which the lens barrel is mounted; upper and lower housings mounted with the common magnet for actuating auto-focusing and handshake compensation, the bobbin assembly, and the auto-focusing corner magnet; and a suspension support member having one end coupled with the auto-focusing actuator and the other end coupled with the housing of the handshake compensating actuator so as to elastically support the auto-focusing actuator to the handshake compensating actuator.

The bobbin assembly may be provided with a first corner part and a second corner part that face each other, an outer side of the opposite first corner part being provided with a yoke, and an outer side of the opposite second corner part being provided with the common magnet for actuating auto-focusing and handshake compensation, and the first corner part of the bobbin assembly may be indented to an inside of the bobbin assembly as much as a size corresponding to the yoke.

The handshake compensating actuator may include a coil for handshake compensation disposed to correspond to the common magnet for actuating auto-focusing and handshake compensation; a printed circuit board for handshake compensation mounted with the coil for handshake compensation so as to be electrically connected; a hall sensor sensing a movement of the lens barrel; and a housing of a handshake compensating actuator mounted with the printed circuit board for handshake compensation and the hall sensor.

The auto-focusing actuator may be seated in the handshake compensating actuator so that the common magnet for actuating auto-focusing and handshake compensation faces the coil for handshake compensation in the state in which the auto-focusing actuator is supported to the suspension support member.

Four common magnets for actuating auto-focusing and handshake compensation may be disposed so as to face the coil for auto-focusing wound around the outer side of the bobbin assembly.

The common magnet for actuating auto-focusing and handshake compensation may be magnetized with two poles in a thickness direction of the common magnet for actuating auto-focusing and handshake compensation that is a direction orthogonal to the optical axis of the camera module and thus, is formed of an inner magnet magnetized to the inner side thereof and an outer magnet magnetized to an outer side thereof, the inner magnet may face the coil for auto-focusing, the outer magnet may face the coil for handshake compensation, and the inner magnet and the outer magnet may be magnetized so that adjacent poles become different poles.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
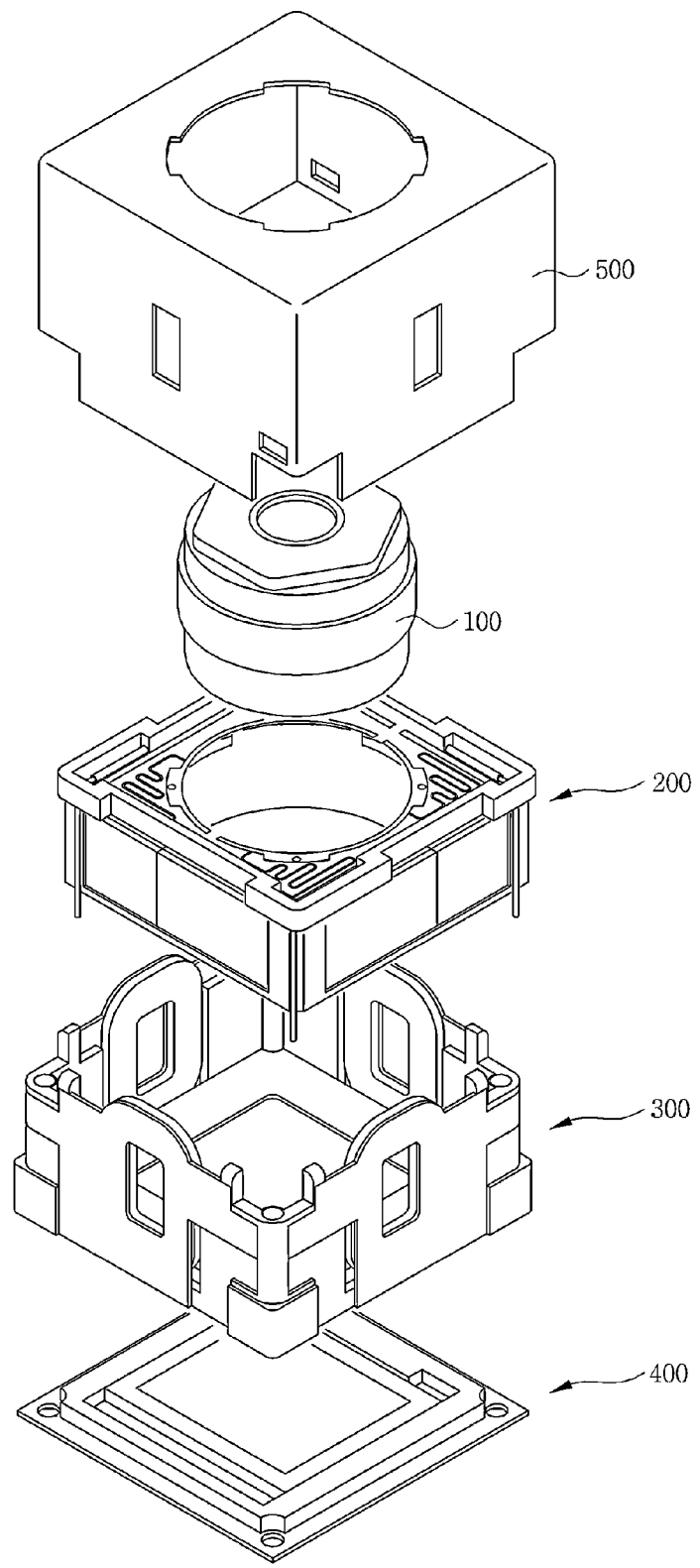
FIG. 1 is a configuration diagram schematically showing a camera module according to a first preferred embodiment of the present invention.

The above and other objects, features and advantages of the present invention will be more clearly understood from preferred embodiments and the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted. In the description, the terms "first", "second", and so on are used to distinguish one element from another element, and the elements are not defined by the above terms.

Hereinafter, preferred embodiments of the present invention will be described in detail with reference to the accompanying drawings.

FIG. 1 is a configuration diagram schematically showing a camera module according to a first preferred embodiment of the present invention. As shown in FIG. 1, the camera module includes a lens barrel 100, an auto-focusing actuator 200, a handshake compensating actuator 300, a sensor package unit 400, and a shield can 500.

In more detail, the lens barrel 100 includes at least one imaging lens and is connected with the auto-focusing actuator 200. Further, the auto-focusing actuator 200 actuates the lens barrel 100 in an optical axis direction to perform an auto-focusing function.

In addition, the auto-focusing actuator 200 is elastically supported to a housing 340 of the handshake compensating actuator 300 and the handshake compensating actuator 300 moves the auto-focusing actuator 200, in which a lens barrel is mounted, in an orthogonal direction of an optical axis with respect to an image sensor of the sensor packet unit 400 to compensate for a user's handshake.

To this end, the sensor package unit 400 includes the image sensor and is coupled with the handshake compensating actuator 300 so as to face the lens barrel 100 in an optical axis direction.

Further, the shield can 500 covers the lens barrel 100, the auto-focusing actuator 200, and the handshake compensating actuator 300 and is coupled with the sensor package unit 400.

Further, the auto-focusing actuator and the handshake compensating actuator according to the preferred embodiment of the present invention include a common magnet for actuating auto-focusing and handshake compensation, one surface of the common magnet for actuating auto-focusing and handshake compensation and an auto-focusing corner magnet face a coil for auto-focusing, the other surface of the common magnet for actuating auto-focusing and handshake compensation faces the coil for handshake compensation, and the common magnet for actuating auto-focusing and handshake compensation and the auto focusing corner magnet that face the coil for auto-focusing are magnetized with the same pole and thus, the auto focusing and the handshake compensation can be actuated by the common magnet for actuating auto-focusing and handshake compensation.

Hereinafter, in the camera module according to the first preferred embodiment of the present invention, a configuration, an organic coupling, and an actuating relationship of the auto-focusing actuator and the handshake compensating actuator will be described below in more detail.

Figure 2:
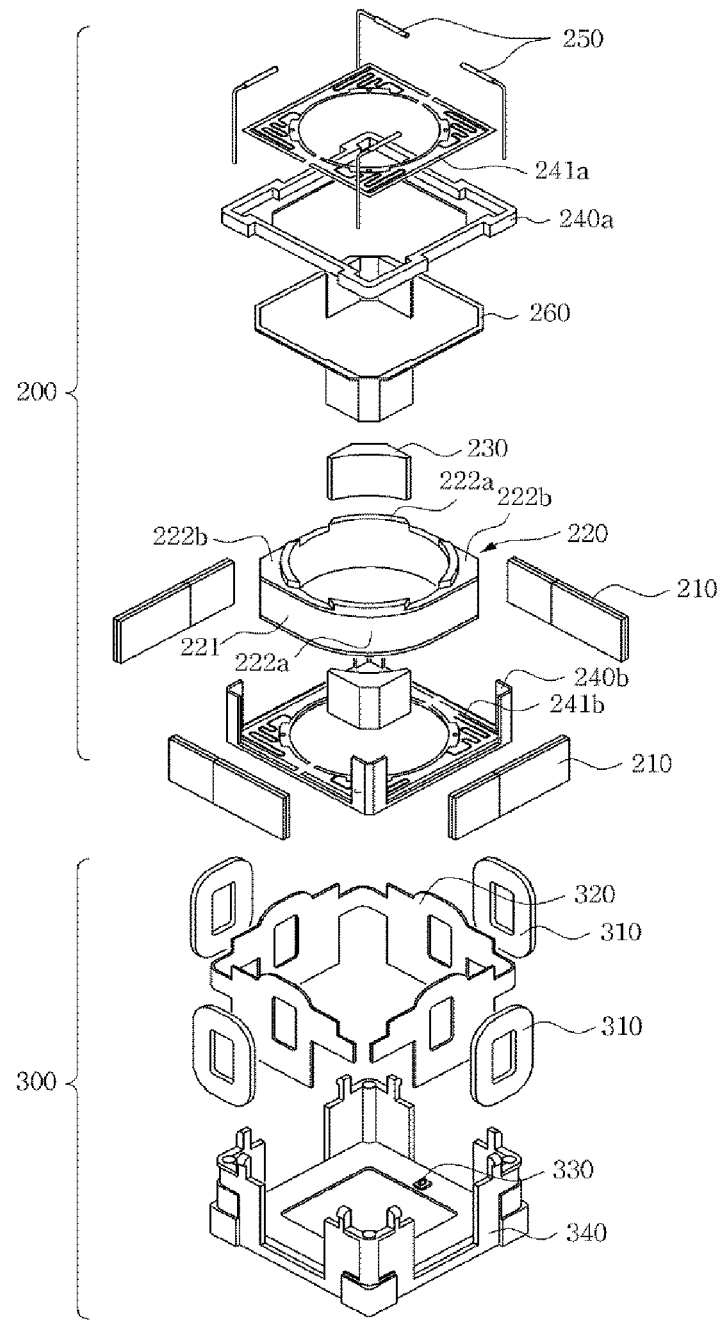
FIG. 2 is an exploded perspective view schematically showing an auto-focusing actuator and a handshake compensating actuator, in the camera module shown in FIG. 1.

FIG. 2 is an exploded perspective view schematically showing an auto-focusing actuator and a handshake compensating actuator, in the camera module shown in FIG. 1.

In more detail, the auto-focusing actuator 200 includes a common magnet 210 for actuating auto-focusing and handshake compensation, a bobbin assembly 220 around which a coil 221 for auto-focusing is wound, an auto-focusing corner magnet 230, upper and lower housings 240a and 240b, and a suspension support member 250.

In addition, an outer circumferential surface of the bobbin assembly 220 is wound with the coil 221 for auto-focusing and an inside thereof is mounted with the lens barrel (not shown). In addition, the bobbin assembly 220 is provided with a first corner part 222a and a second corner part 222b that face each other, wherein an outer side of the opposite first corner part 222a is provided with the auto-focusing corner magnet 230 and an outer side of the opposite second corner part is provided with the common magnet for actuating auto-focusing and handshake compensation. In addition, as shown in FIGS. 2 and 3, the first corner part 222a is formed so as to be indented to an inner side of the bobbin assembly 220 as much as a size corresponding to the auto-focusing corner magnet 230.

In order to increase actuating force in the optical axis direction at the time of applying current to the AF coil, that is, in terms of the AF coil, this is implemented to face one pole of the common magnet for actuating auto-focusing and handshake compensation so as to be closest thereto and to face the other pole thereof so as to be farthest therefrom.

Figure 3:
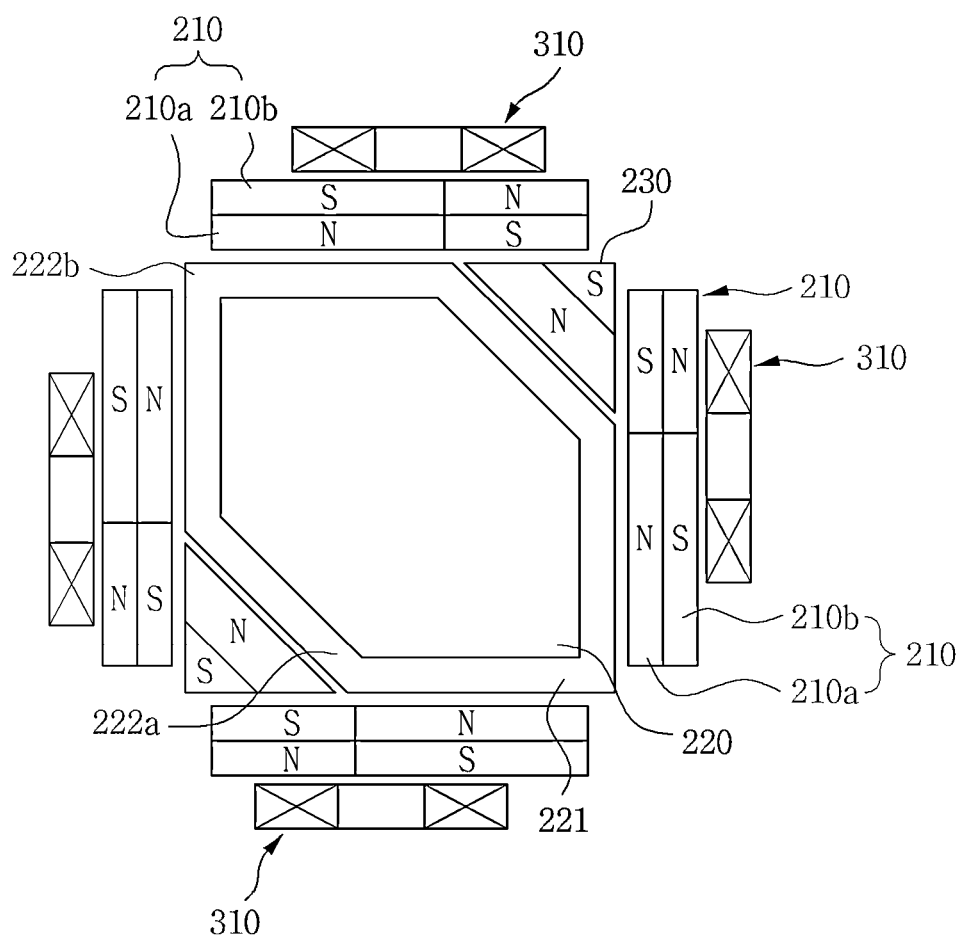
FIG. 3 is a configuration diagram schematically showing a magnet and a coil, in the auto-focusing actuator and the handshake compensating actuator shown in FIG. 2.

For example, a section of the bobbin assembly 220 may have a diamond shape of which the outer circumferential surface has curved shape as shown in FIG. 2, a hexagonal shape as shown in FIG. 3.

Further, the common magnet 210 for actuating auto-focusing and handshake compensation has a plate shape and is disposed to face the coil 221 for auto-focusing of the bobbin assembly 220.

In addition, as described above, the auto-focusing corner magnet 230 is disposed to face the auto-focusing coil 221 at the outer side of the first corner part 222a of the bobbin assembly 220.

In addition, the auto-focusing actuator 200 may include a yoke 260, wherein the yoke 260 is coupled with the upper or lower housings 240a and 240b so as to cover the common magnet 210 for actuating auto-focusing and handshake compensation and one surface of the auto-focusing corner magnet 230.

In addition, the common magnet 210 for actuating auto-focusing and handshake compensation, the bobbin assembly 220 around which the coil 221 for auto-focusing is wound, the auto focusing corner magnet 230, and the yoke 260 are mounted between the upper and lower housings 240a and 240b.

In addition, the upper housing 240a and the lower housing 240b are each provided with an upper plate elastic member 241a and a lower plate elastic member 241b, wherein the upper plate elastic member 241a and the lower plate elastic member 241b may be each mounted at a front of the upper housing 240a and a rear of the lower housing 240b with respect to the optical axis direction.

In addition, the suspension support member 250 elastically supports the auto-focusing actuator 200 to the handshake compensating actuator 300. To this end, one end of the suspension support member 250 is coupled with the auto-focusing actuator 200 and the other end is coupled with the handshake compensating actuator 300.

Next, the handshake compensating actuator 300 includes a coil 310 for handshake compensation, a printed circuit board 320 for handshake compensation, a hall sensor 330, and a housing 340 for the handshake compensating actuator.

In more detail, the coil 310 for handshake compensation is disposed to face the common magnet 210 for actuating auto-focusing and handshake compensation and is mounted on the printed circuit board 320 for handshake compensation so as to be electrically connected.

In addition, the hall sensor 330 is to sense the movement of the auto-focusing actuator 200 in which the lens barrel is mounted.

Further, the housing 340 of the handshake compensating actuator is mounted with the printed circuit board 320 for handshake compensation and the hall sensor 330.

The auto-focusing actuator 200 configured as described above is seated in the handshake compensating actuator 300 so that the common magnet 210 for actuating auto-focusing and handshake compensation faces the coil 310 for handshake compensation in the sate in which the auto-focusing actuator 200 is supported to the suspension support member 250.

Hereinafter, in the camera module according to the first preferred embodiment of the present invention, a position and an organic coupling relationship of the coil for auto-focusing and the coil for handshake compensation due to the magnetization of the common magnet for actuating auto-focusing and handshake compensation and the auto-focusing corner magnet will be described in more detail.

FIG. 3 is a configuration diagram schematically showing a magnet and a coil, in the auto-focusing actuator and the handshake compensating actuator shown in FIG. 2.

As shown in FIG. 3, four common magnets 210 for actuating auto-focusing and handshake compensation are disposed and two auto-focusing corner magnets 230 are disposed, so as to face the coil 221 for auto-focusing wound around the outer side of the bobbin assembly 220.

In this case, the common magnet 210 for actuating auto-focusing and handshake compensation is magnetized so that the pole facing the coil 221 for auto-focusing is the same pole and FIG. 3 shows an embodiment that is magnetized with an N pole.

That is, the N poles of the common magnet 210 for actuating auto-focusing and handshake compensation is disposed to face the second corner part 222b of the bobbin assembly 220 and the N pole of the auto-focusing corner magnet 230 is disposed to face the first corner part 222a.

In addition, the common magnet 210 for actuating auto-focusing and handshake compensation are magnetized with two poles in a direction orthogonal to the optical axis of the camera module, that is, a thickness direction of the common magnet 210 for actuating auto-focusing and handshake compensation.

Therefore, an inner magnet 210a magnetized to the inside thereof faces the coil 221 for auto-focusing and an outer magnet 210b magnetized to the outside thereof faces the coil 310 for handshake compensation. In addition, the inner magnet 210a and the outer magnet 210b are magnetized so that the adjacent poles become different poles.

According to the above configuration, when current is applied to the coil 310 for handshake compensation, the auto-focusing actuator 200 including the bobbin assembly 220 in which the lens to barrel is received moves in the orthogonal direction of the optical axis, that is, in X and Y directions by Lorentz force with the common magnet 210 for actuating auto-focusing and handshake compensation to compensate for the user's handshake.

In addition, when current is applied to the coil 221 for auto-focusing, the bobbin assembly in which the lens barrel is mounted moves in the optical axis direction by electromagnetic force with the common magnet 210 for actuating auto-focusing and handshake compensation to implement the auto-focusing.

In this case, the coil 221 for auto-focusing improves the actuating force of the auto-focusing due to the electromagnetic force with the auto-focusing corner magnet 230 in addition to the electromagnetic force with the common magnet 210 for actuating auto-focusing and handshake compensation.

Figure 4:
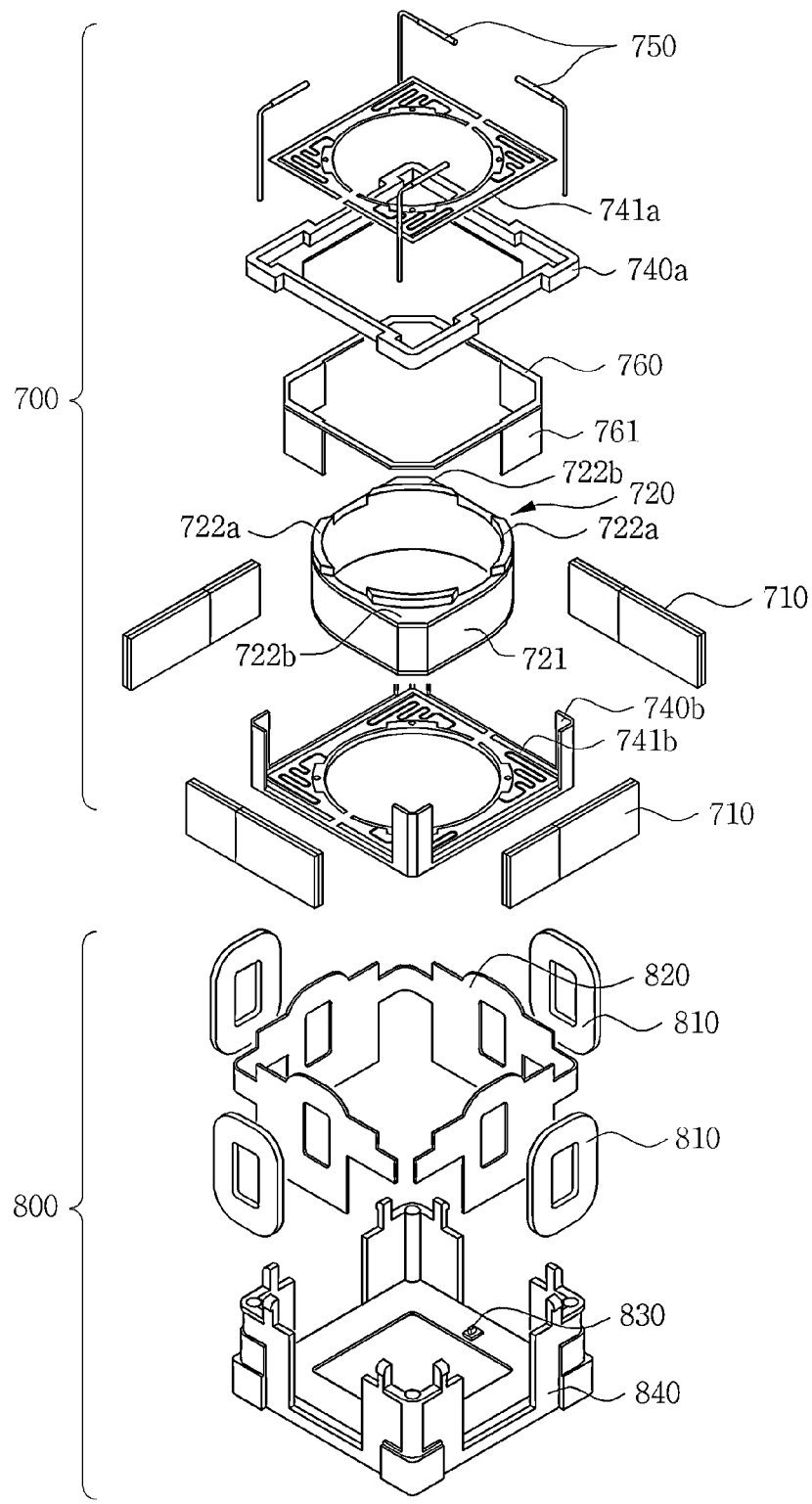
FIG. 4 is an exploded perspective view schematically showing an auto-focusing actuator and a handshake compensating actuator, in a camera module according to a second preferred embodiment of the present invention.
Figure 5:
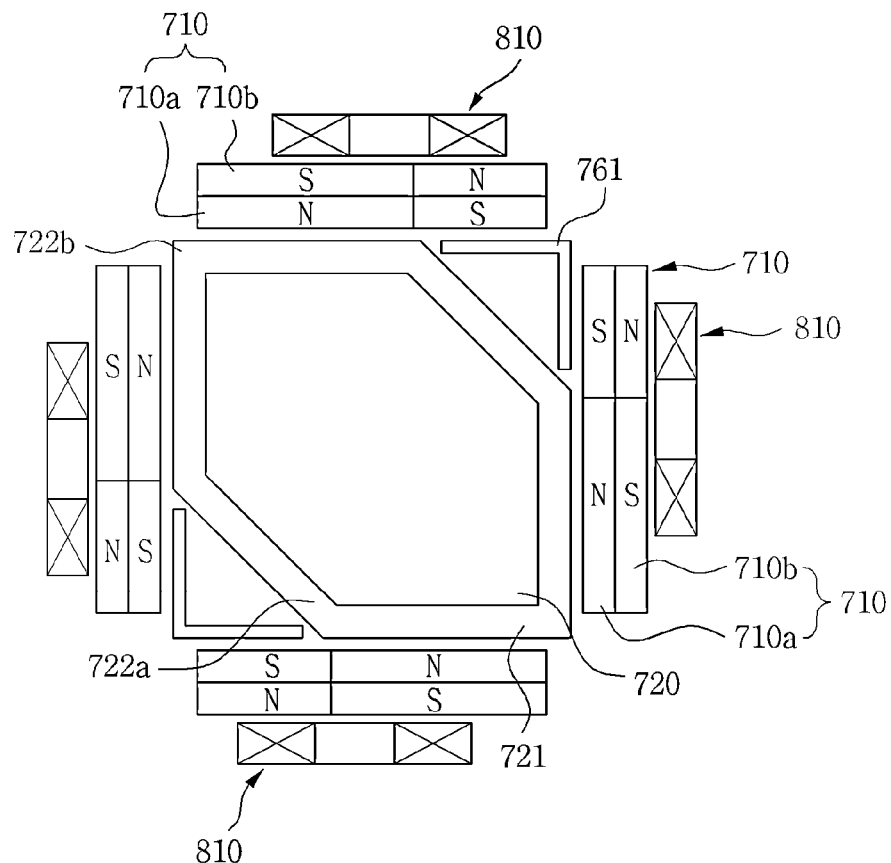
FIG. 5 is a configuration diagram schematically showing a magnet and a coil, in the auto-focusing actuator and the handshake compensating actuator shown in FIG. 4.

As a result, the camera module according to the first preferred embodiment of the present invention may improve the actuating force of the auto-focusing by including the auto-focusing corner magnet while actuating the auto-focusing and the handshake compensation by a single common magnet FIG. 4 is an exploded perspective view schematically showing an auto-focusing actuator and a handshake compensating actuator, in a camera module according to a second preferred embodiment of the present invention and FIG. 5 is a configuration diagram schematically showing a magnet and a coil, in the auto-focusing actuator and the handshake compensating actuator shown in FIG. 4.

As shown in FIGS. 4 and 5, the auto-focusing actuator and the handshake compensating actuator of the camera module according to the second preferred embodiment of the present invention is configured without the auto-focusing corner magnet when comparing with the auto-focusing actuator and the handshake compensating actuator of the camera module according to the first preferred embodiment of the present invention.

In more detail, an auto-focusing actuator 700 includes a common magnet 710 for actuating auto-focusing and handshake compensation, a bobbin assembly 720 around which a coil 721 for auto-focusing is wound, upper and lower housings 740a and 740b, and a suspension support member 750.

In addition, one pole of the common magnet for actuating auto-focusing and handshake compensation adjacently faces the coil for auto-focusing and the other pole of the common magnet for actuating auto-focusing and handshake compensation is disposed farther from the coil for auto-focusing when comparing with one pole.

Further, the bobbin assembly 720 may have, for example, but not limited to, the same or similar shape and technical configuration as the bobbin assembly 220 of the camera module according to the first embodiment of the present invention.

That is, the bobbin assembly 720 is wound around the outer circumferential surface of the coil 721 for auto-focusing and has an inner portion in which the lens barrel (not shown) is mounted. Further, the bobbin assembly 720 is provided with a first corner part 722*a* and a second corner part 722*b* that face each other and an outer side of the opposite first corner part 722*a* is provided with a yoke 760 and an outer side of the opposite second corner part is provided with the common magnet for actuating auto-focusing and handshake compensation.

In order to increase actuating force in the optical axis direction at the time of applying current to AF coil, that is, in terms of the AF coil, so as to face one pole (herein, an N pole) of the common magnet for actuating auto-focusing and handshake compensation so as to be closest thereto and to face the other pole (herein, an S pole) thereof so as to be farthest therefrom, the first corner part 722*a* of the bobbin assembly 720 is formed so as to be indented.

Further, the common magnet 710 for actuating auto-focusing and handshake compensation has a plate shape and is disposed to face the coil 721 for auto-focusing of the bobbin assembly 720.

Further, the auto-focusing actuator may be configured to further include the yoke 760. In more detail, the yoke 760 has a plate shape and a cover part 761 is formed to cover one surface of the common magnet 710 for actuating auto-focusing and handshake compensation and protruded downwardly to cover one pole of the common magnet 710 for actuating auto-focusing and handshake compensation facing the auto-focusing coil 721 and is coupled with an upper housing 740*a* and a lower housing 740*b*.

In addition, the common magnet 710 for auto-focusing and handshake compensation, the bobbin assembly 720 around which the coil 721 for auto-focusing is wound, and the yoke 760 are mounted between the upper and lower housings 740*a* and 740*b*. In addition, an upper plate elastic member 741*a* and a lower plate elastic member 741*b* are each mounted at a front of the upper housing 740*a* and a rear of the lower housing 740*b* with respect to the optical axis direction.

In addition, the suspension support member 750 elastically supports the auto-focusing actuator 700 to a handshake compensating actuator 800. To this end, one end of the suspension support member 750 is coupled with the auto-focusing actuator 700 and the other end is coupled with the handshake compensating actuator 800.

Next, the handshake compensating actuator 800 includes a coil 810 for handshake compensation, a printed circuit board 820 for handshake compensation, a hall sensor 830, and a housing 840 for the handshake compensating actuator.

In addition, the actuator 800 for handshake compensation has the same technical configuration and shape as the handshake compensating actuator 300 of the camera module according to the first preferred embodiment of the present invention as described above.

Hereinafter, in the camera module according to the second preferred embodiment of the present invention, the position and organic coupling relationship of the coil for auto-focusing and the coil for handshake compensation due to the magnetization of the common magnet for actuating auto-focusing and handshake compensation will be described in more detail.

As shown, four common magnets 710 for actuating auto-focusing and handshake compensation are disposed so as to be opposite to the coil 721 for auto-focusing wound around the outer side of the bobbin assembly 720.

In this case, the common magnet 710 for actuating auto-focusing and handshake compensation is magnetized so that the pole facing the coil 721 for auto-focusing is the same pole and FIG. 3 shows an embodiment that is magnetized with an N pole.

That is, the N poles of the common magnet 710 for actuating auto-focusing and handshake compensation is disposed to face the first corner parts 722*a* of the bobbin assembly 720 and the S pole of the common magnet 710 for actuating auto-focusing and handshake compensation is disposed to face the cover part 761 of the yoke 760.

As a result, one pole of the common magnet for actuating auto-focusing and handshake compensation faces the coil for auto-focusing and the other pole of the common magnet for actuating auto-focusing and handshake compensation is covered by the yoke.

In addition, the common magnet 710 for actuating auto-focusing and handshake compensation are magnetized with two poles in a direction orthogonal to the optical axis of the camera module, that is, a thickness direction of the common magnet 710 for actuating auto-focusing and handshake compensation.

Therefore, an inner magnet 710*a* magnetized to the inside thereof faces the coil 721 for auto-focusing and an outer magnet 710*b* magnetized to the outside thereof faces the coil 810 for handshake compensation. In addition, the inner magnet 710*a* and the outer magnet 710*b* are magnetized so that the adjacent poles become different poles.

According to the above configuration, when current is applied to the coil 810 for handshake compensation, the auto-focusing actuator 700 including the bobbin assembly 720 in which the lens barrel is received moves in the orthogonal direction of the optical axis, that is, in X and Y directions by Lorentz force with the common magnet 710 for actuating auto-focusing and handshake compensation to compensate for the user's handshake.

In addition, when current is applied to the coil 721 for auto-focusing, the bobbin assembly in which the lens barrel is mounted moves in the optical axis direction by electromagnetic force with the common magnet 710 for actuating auto-focusing and handshake compensation to implement the auto-focusing.

As a result, the camera module according to the second preferred embodiment of the present invention can perform the auto-focusing and the handshake compensation using the single common magnet for actuating auto-focusing and handshake compensation and can adjust and control the actuating force and the actuating sensitivity of the auto-focusing based on a design of a polarization length ratio of the common magnet for actuating auto-focusing and handshake compensation to be described below.

Figure 6:
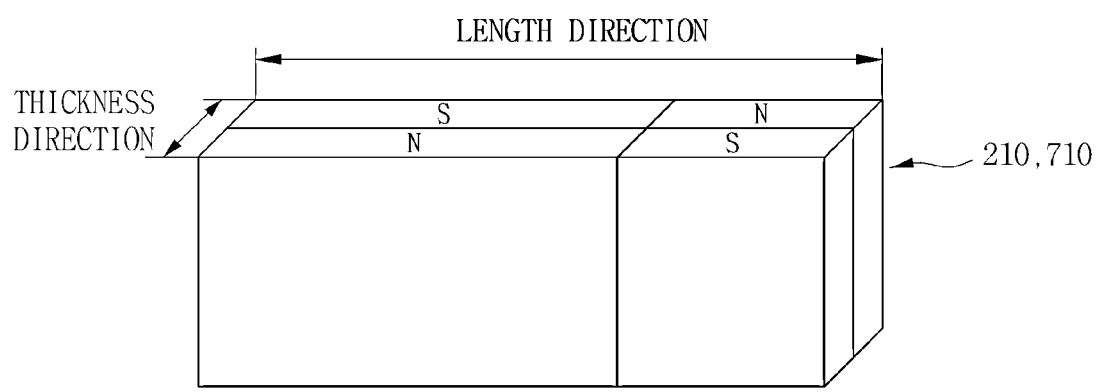
FIG. 6 is a perspective view schematically showing the magnet of the auto-focusing actuator and the handshake compensating actuator according to the first and second preferred embodiments of the present invention.

FIG. 6 is a perspective view schematically showing the magnet of the auto-focusing actuator and the handshake compensating actuator according to the first and second preferred embodiments of the present invention. As shown in FIG. 6, the common magnets 210 and 710 for actuating auto-focusing and handshake compensation are magnetized with two poles in a direction orthogonal to the optical axis of the camera module, that is, a thickness direction of the common magnet for actuating auto-focusing and handshake compensation.

Further, as described above, an inner magnet magnetized to the inside thereof faces the coil for auto-focusing and an outer magnet magnetized to the outside thereof faces the coil for handshake compensation. In addition, the inner magnet and the outer magnet are magnetized so that the adjacent poles become different poles.

In addition, in the inner magnet and the outer magnet, the actuating force, that is, the actuating sensitivity of the auto-focusing is changed according to a polarization length ratio in a magnetized length direction. Generally, a polarization ration in a length direction of a plate magnet is 1:1 but the common magnet for actuating auto-focusing and handshake compensation according to the embodiment of the present invention is polarized at a length ratio of 1:N (N=1 to 5), wherein a pole of which the polarization length ratio is N faces the coil for auto-focusing.

That is, a length of one pole facing the coil for auto-focusing may be magnetized larger than the length of the other pole adjacent thereto to increase the actuating force of the auto-focusing, such that the control and design of the actuating force of the auto-focusing can be implemented.

Further, when the actuating force of the auto-focusing is secured at a desired degree by adjusting the length ratio polarized by the common magnet for actuating auto-focusing and handshake compensation, the actuating of the auto-focusing and the handshake compensation can be performed by the single common magnet without the separate auto-focusing corner magnet.

In order to more efficiently implement this, the bobbin assembly according to the first preferred embodiment of the present invention is adjacently disposed to the common magnet for actuating auto-focusing and handshake compensation and the auto focusing corner magnet and the bobbin assembly according to the second preferred embodiment of the present invention is adjacently disposed to one pole of the opposite common magnet for actuating auto-focusing and handshake compensation and is disposed so as to be spaced apart from the other pole covered by the cover part of the yoke as maximally as possible. To this end, the bobbin assembly is provided with the indented first corner part.

As a result, the auto-focusing actuator and the handshake compensating actuator of the camera module according to the preferred embodiment of the present invention can perform the actuating of the auto-focusing and the actuating of the handshake compensation by the single common magnet and can improve the actuating force of the auto-focusing, including the auto-focusing corner magnet.

According to the embodiment of the present invention, it is possible to obtain the camera module capable of more efficiently actuating the auto-focusing by including the auto-focusing actuator and the handshake compensating actuator that include the common magnet for actuating auto-focusing and handshake compensation to perform the auto-focusing and the handshake compensation by the common magnet and capable of adjusting and controlling the actuating force to and the actuating sensitivity of auto-focusing by adjusting the polarization length of the common magnet for actuating auto-focusing and handshake compensation that is opposite to the coil for auto-focusing.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. The camera module, comprising:
an auto-focusing actuator moving a lens barrel in an optical axis direction and comprising a coil for auto-focus; and
a handshake compensating actuator moving the lens barrel and comprising a coil for handshake compensation;
a common magnet for the coils for auto-focus and handshake compensation; and
a bobbin assembly around which the coil for auto-focus is wound and in which the lens barrel is mounted,
wherein the common magnet comprises a first magnet facing the coil for auto-focus and a second magnet facing the coil for handshake compensation, and
wherein a surface of the first magnet facing the coil for auto-focus is polarized in an opposite direction to a surface of the second magnet facing a coil for handshake compensation,
wherein the bobbin assembly is provided with a first corner part and a second corner part that face each other and the first corner part of the bobbin assembly is indented to an inside of the bobbin assembly and an outer side of the second corner part is provided with one pole of the first magnet.

2. The camera module as set forth in claim 1, wherein the auto-focusing actuator includes:
one or more housings mounted with the common magnet and the bobbin assembly; and
a suspension support member having one end coupled with the auto-focusing actuator and another end coupled with the housing of the handshake compensating actuator, the suspension support member elastically coupling the auto-focusing actuator to the handshake compensating actuator.

3. The camera module as set forth in claim 2, wherein an outer side of the opposite first corner part being provided with a yoke, and an outer side of the opposite second corner part being provided with the one pole of the first magnet.

4. The camera module as set forth in claim 1, wherein the handshake compensating actuator includes:
a printed circuit board for handshake compensation electrically connected with the coil for handshake compensation;
a hall sensor sensing a movement of the lens barrel; and
a housing of a handshake compensating actuator mounted with the printed circuit board and hall sensor.

5. The camera module as set forth in claim 2, wherein the auto-focusing actuator is seated in the handshake compensating actuator in the state in which the auto-focusing actuator is supported by suspension support member.

6. The camera module as set forth in claim 2, wherein at least four common magnets for the coils for auto-focus and handshake compensation are disposed so as to face the foil for auto-focusing wound around an outer side of the bobbin assembly.

7. The camera module as set forth in claim 1, wherein the common magnet for the coils for auto-focus and handshake compensation is magnetized with two poles in a thickness direction of the common magnet that is orthogonal to the optical axis, and
wherein the first magnet is an inner magnet magnetized to an inner side of the common magnet and the second magnet is an outer magnet magnetized to an outer side of the common magnet.

8. The camera module of claim 1, wherein one pole of the first magnet is positioned closer to the coil for auto-focus than an other pole of the first magnet.

9. The camera module of claim 8, wherein a length of the one pole of the first magnet is longer than a length of the other pole of the first magnet.

10. The camera module of claim 1, wherein the handshake compensating actuator moves the lens barrel in a direction substantially orthogonal to the optical axis.

11. A camera module, comprising:
at least one common magnet moving a lens barrel in an optical axis direction for auto-focus and moving the lens barrel in a direction different from the optical axis direction for handshake compensation, wherein one surface of the common magnet facing the lens barrel is polarized in an opposite direction to another surface of the common magnet facing a coil for handshake compensation;
a bobbin assembly around which a coil for auto-focus is wound and in which the lens barrel is mounted;
wherein the bobbin assembly is provided with a first corner part and a second corner part that face each other and the first corner part of the bobbin assembly is indented to an inside of the bobbin assembly and an outer side of the second corner part is provided with one pole of the common magnet;
wherein the common magnet comprises:
a first magnet facing the coil for auto-focus; and
a second magnet facing the coil for handshake compensation,
wherein the first magnet and the second magnet having opposite poles are disposed side by side.

12. The camera module of claim 11, wherein the one surface of the common magnet faces the coil for auto focus.

13. A camera module of claim 12, wherein one pole of the one surface of the common magnet facing the lens barrel is positioned closer to the coil for auto-focus than another pole of the one surface of the common magnet facing the lens barrel.

14. The camera module of claim 13, wherein the camera module comprises a plurality of common magnets, and the one pole of the one surface of the plurality of common magnets facing the lens barrel has the same pole as each other.

15. The camera module of claim 11, wherein the common magnet is polarized in a direction perpendicular to the optical axis.

16. The camera module of claim 11, wherein a length of one pole of the common magnet is longer than a length of another pole of the common magnet.

17. The camera module of claim 12, further comprising:
an auto-focusing actuator comprising the coil for auto-focus; and
an handshake compensation actuator comprising the coil for handshake compensation,
wherein the auto-focus actuator is elastically supported by the handshake compensation actuator.

18. The camera module of claim 12, wherein one pole of the common magnet is positioned closer to the coil for auto-focus than an other pole of the common magnet, and a length of the one pole of the common magnet is longer than a length of the other pole of the common magnet.

19. The camera module of claim 11, wherein the lens barrel is movable in a direction substantially perpendicular to the optical axis for handshake compensation.

* * * * *